United States Patent [19]
Arand et al.

[11] Patent Number: 5,824,209
[45] Date of Patent: *Oct. 20, 1998

[54] METHOD AND APPARATUS FOR CATALYTIC LOW TEMPERATURE AIR PRESSURE REFORMING OF LIGHT HYDROCARBON FUELS FOR SELECTIVE PRODUCTION OF AROMATICS, OLEFINS, AND SATURATES

[75] Inventors: Anthony J. Arand, Escondido; John K. Arand, Jr., Rancho Palos Verdes, both of Calif.

[73] Assignee: Pac Rim Products, Inc., Escondido, Calif.

[*] Notice: The portion of the term of this patent subsequent to Feb. 28, 2012, has been disclaimed.

[21] Appl. No.: 395,870

[22] Filed: Feb. 28, 1995

Related U.S. Application Data

[63] Continuation-in-part of Ser. No. 941,408, Sep. 8, 1992, Pat. No. 5,393,413.

[51] Int. Cl.[6] ............... C10G 35/04; C10G 35/06; F02M 27/02
[52] U.S. Cl. ............... 208/135; 208/134; 208/136; 208/137; 123/1 A
[58] Field of Search .................. 208/134, 135, 208/136, 137; 123/1 A

[56] References Cited

U.S. PATENT DOCUMENTS

| | | | |
|---|---|---|---|
| 3,717,129 | 2/1973 | Fox | 123/1 A |
| 4,429,665 | 2/1984 | Brown | 123/1 A |
| 4,715,325 | 12/1987 | Walker | 123/1 A |
| 4,959,155 | 9/1990 | Gomez | 210/687 |
| 5,059,217 | 10/1991 | Arroyo et al. | 123/1 A |
| 5,092,303 | 3/1992 | Brown | 123/1 A |
| 5,393,413 | 2/1995 | Arand et al. | 208/134 |

*Primary Examiner*—Walter D. Griffin
*Attorney, Agent, or Firm*—Blakely, Sokoloff Taylor & Zafman

[57] ABSTRACT

A process for the improvement of hydrocarbon fuels using a low temperature and pressure catalytic system is described. The reforming of these products occurs when the hydrocarbon fuel is passed over an alloy metal catalyst at low temperature (i.e., about −50° F. to 250° F.) and pressure (i.e., about 10 to 100 psia). The alloy metal catalyst is housed in a non-electrical conducting chamber and is operated with fluid Reynolds Numbers over the catalyst surface of about $2 \times 10^3$ to $20 \times 10^4$. The hydrocarbon fuel is recirculated over the alloy metal catalyst between 1 and approximately 100 times. This process results in reformed hydrocarbon fuels having superior performance qualities than the base hydrocarbon fuel. Vehicle road tests using such reformed fuels have shown substantial mileage improvements over the base fuels.

3 Claims, 3 Drawing Sheets

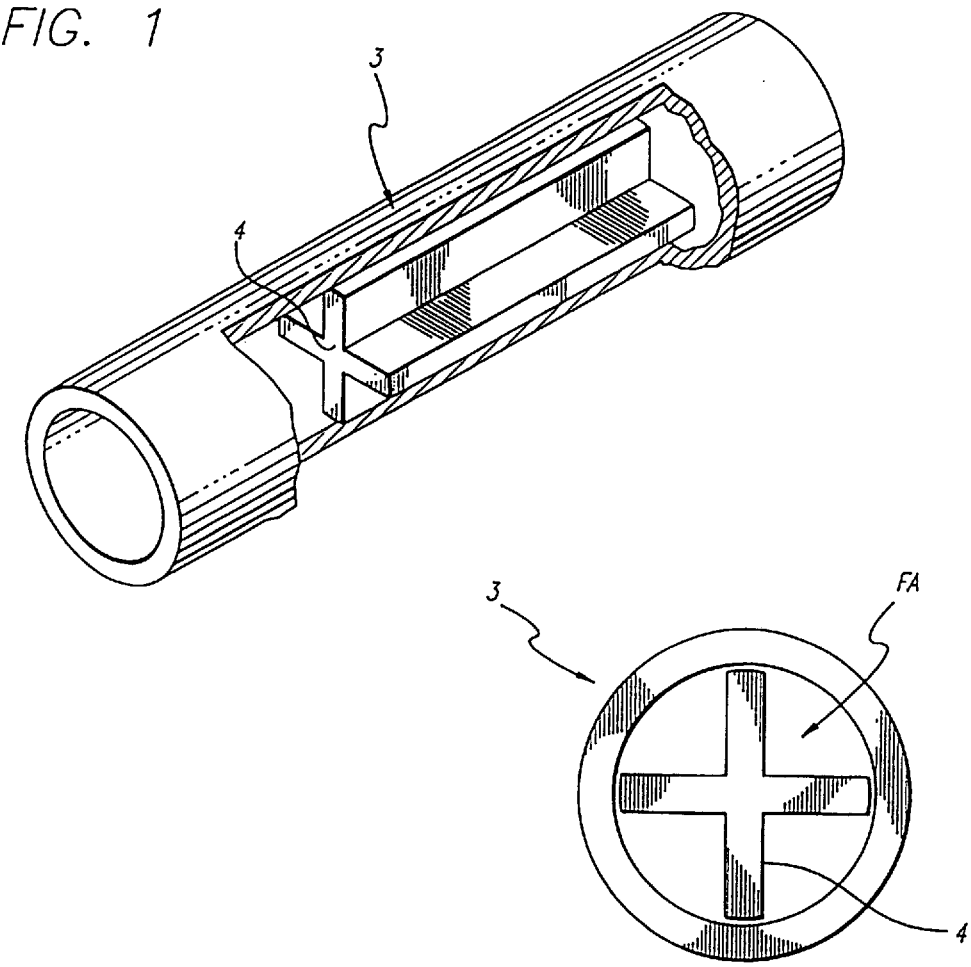
FIG. 1
FIG. 2
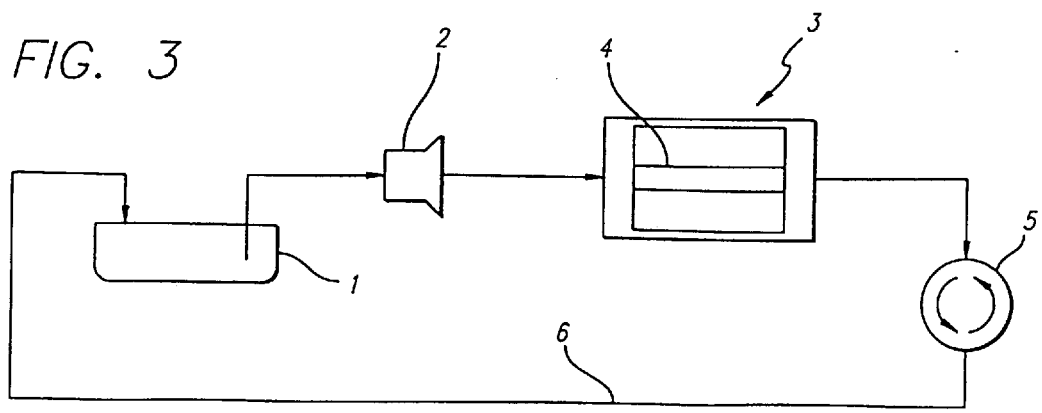
FIG. 3

METHOD AND APPARATUS FOR CATALYTIC LOW TEMPERATURE AIR PRESSURE REFORMING OF LIGHT HYDROCARBON FUELS FOR SELECTIVE PRODUCTION OF AROMATICS, OLEFINS, AND SATURATES

RELATED APPLICATIONS

The present application is a continuation in part of application Ser. No. 07/941,408, filed on Sep. 8, 1992, now U.S. Pat. No. 5,393,413 issuing Feb. 28, 1995.

BACKGROUND OF THE INVENTION

1. Field of the Invention

The present invention is directed to an apparatus utilizing metal catalysts for improving fuel economy in gasoline and diesel powered equipment, and the methods for using same.

2. Background

In recent years a number of products have been brought to the marketplace with claims of improved fuel economy and performance for ignition and compression piston engines.

Catalysts are often incorporated in such products. Dissimilar metal catalysts have been used in oil drilling operations since about 1970. Such dissimilar metal catalysts were used at the well head and minimized the build up of scale and other deposits on the walls of the well head.

Several manufacturers have recently placed in line catalytic products on the market for improving the efficiency of gasoline and diesel engines, which products are believed to be based upon the aforementioned catalyst technology used in the oil drilling operation. There have been claims that such devices can be used on either gasoline or diesel powered vehicles. However, the use of those types of products have not been wide spread because the products currently being produced either do not work at all, or do not work consistently. A device which may show improvement on certain gasoline engines may not show an improvement on other gasoline engines or when used on a diesel engine. The converse is also true, in that a device which works on a diesel engine may not work on a gasoline engine. Few scientific investigations have been conducted to attempt to explain or understand the phenomenon of how these metal catalysts are able to produce the effect seen on the hydrocarbon fuels.

Explanations for how the products function rely mostly upon the theory that the device polarizes the fuel molecules. In some instances the location of the device must be as close as possible to the fuel introduction to the engine as it is believed that the device's effect on the fuel is temporary.

U.S. Pat. No. 4,959,155 discloses a method for purification of fluids such as water, aqueous fluids and fuel fluids (e.g., gasoline and diesel fuels) by using a solid body alloy in a chamber and passing the fluid to be purified over the solid body alloy and through the chamber. It is stated that such process results in the purification of the fluid and in the case of fuels for internal combustion engines the polluting emissions are reduced because of better combustion and that maintenance costs are lowered. However, this patent does not deal with the effects obtained under certain Reynolds Number conditions nor the unexpected results achieved by recirculation of the fuels as explained in greater detail hereinbelow.

None of the in-line catalysts products of which the applicants are aware produce consistent results in fuel economies of performance on either gasoline or diesel fuels.

Petroleum based fuels are the primary fuels used for automobiles, stationary and mobile diesel powered equipment, jet engines and a wide variety of stationary devices. These lightweight fuels, including gasoline, diesel and kerosene fuels, are composed of blends of refinery stocks. All have three basic hydrocarbon types, namely, saturates (naphthenes and paraffins), olefin and aromatics. Typical mass fractions of these hydrocarbons found in these fuels are given in Table A.

TABLE A (Prior Art Information)
PROXIMATE ANALYSIS OF LIGHT LIQUID FUELS[1] % MASS

| | GASOLINES | | KEROSENES | | | DIESELS | | |
|---|---|---|---|---|---|---|---|---|
| | iso octane | 100/300 octane | 80 octane | Wide cut | Aviation | High Flash Point | Gas oil | Med |
| AROMATICS | 0 | 13.5 | 14 | 20.5 | 7.5 | 22 | 24 | 16 |
| OLEFINS | 0 | 0.5 | 28 | 1.5 | 0.5 | 0.5 | 3.5 | 8 |
| NAPHTHENES | 0 | 14 | 14 | 23 | 29 | 39 | 31 | 28 |
| PARAFFINS | 100 | 72 | 44 | 55 | 63 | 38.5 | 41.5 | 48 |

[1]Gas Turbine Fuels And Their Influence on Combustion J. Odgers And D. Kretschmer, Abacus Press 1986

The percentage of these three hydrocarbon types present in each of the three fuels determine the performance characteristics of these fuels in the respective power generating equipment employing these fuels. For instance, high aromatic content in the fuels used in gas turbines and diesel engines tend to result in smoke emissions and carbon formation in the exhaust gases from these devices, whereas in gasolines, the slow burning aromatics can act to reduce the knocking tendencies of gasoline. In the refining of these fuels catalytic cracking at high temperatures and pressures can be employed to produce the three hydrocarbon types found in these fuels.

None of the prior art of which applicants are aware teaches effective and consistent methods to control emissions with the in-line devices on gasoline or diesel engines. Nor does the prior art define the parameters essential to achieving a successful improvement in fuel economy when such a device is installed on a vehicle. The present invention is based upon the chemical changes of the fuels over a wide range of fuel flow, Reynolds Numbers, catalyst composition, catalyst configuration, fuel composition, location of the catalyst in the system and system configurations.

The present invention defines the operating parameters and apparatus essential to achieving increased fuel economy and reduced exhaust emissions on diesel and gasoline engines with light hydrocarbon fuels. A variety of metal catalysts including elemental metals and alloys have been shown to be effective in this invention.

In the process of the present invention, low temperature reforming using metal catalysts is utilized to improve the hydrocarbon fuels, it is believed, by changing the relationship and percentage of each type of hydrocarbon present in the fuels.

The above-referenced parent patent was directed to the use of a specific copper/nickel alloy metal catalysts. The present invention expands the scope of the present invention to cover catalysts made from a wide range of alloys with different base elements when used in the manner described in the original patent application. Since there are a wide range of parameters that could be considered in the application of the claimed device, the evaluation of the metal catalysts considered was restricted to the preferred operating conditions which found to produce the best performance when using the copper/nickel alloys; namely a flow rate of 1.6 GPM, 25 cycles over the catalysts, a smooth catalyst configuration of approximately ⅜ inch diameter, and a Reynolds Number of approximately $6 \times 10^4$ in the preferred embodiment.

All test evaluations were made using ARCO unleaded 87 Octane gasoline as a base fuel. Evaluations were made on both summer and winter (oxygenated) grades of fuel.

It is conceivable that the parameters used in these evaluations are not optimum for each catalyst. Those knowledgeable in the art will recognize the scope of the possible number of different alloys and tests which could have been performed to demonstrate that the claimed process is applicable to all metal alloys. Sufficient data was obtained to show that "pure" metal catalysts do not exhibit the performance characteristics of metal alloy catalysts, i.e., there are no benefits when this process is used with a "pure" metal catalyst, and that not all metal alloy catalysts, under the conditions described above, perform in exactly the same manner.

SUMMARY OF THE INVENTION

The present invention is directed to an apparatus and method for improving the efficiency of a hydrocarbon-powered engine. A number of metal catalysts have been evaluated. The exact mechanism which allow these catalysts to alter the hydrocarbon fuels is not totally understood at this time. However, under the conditions previously described and as defined herein, all metal catalysts which consist of an alloy composition produced performance changes in the test fuels. On the other hand, the one "pure" metal catalyst did not produce any changes.

A total of seven different catalysts were evaluated. The choice of the metals used was based on the electrical resistivity of the metals. While not being bound to any particular theory of operation, it was thought that this parameter may be partially responsible for the improvement in the fuel operation. The intent was to cover as wide a range of electrical resistivity as possible for all practical metals commercially available.

BRIEF DESCRIPTION OF THE DRAWINGS

FIG. 1 illustrates a typical catalyst installed in a typical non-electrical conducting housing which is basically a constant diameter tube.

FIG. 2 is a cross-sectional view of the configuration depicted in FIG. 1.

FIG. 3 is a schematic of a typical in-line fuel treatment system.

DETAILED DESCRIPTION OF THE INVENTION

Reynolds Number Calculations

Figure 4A:
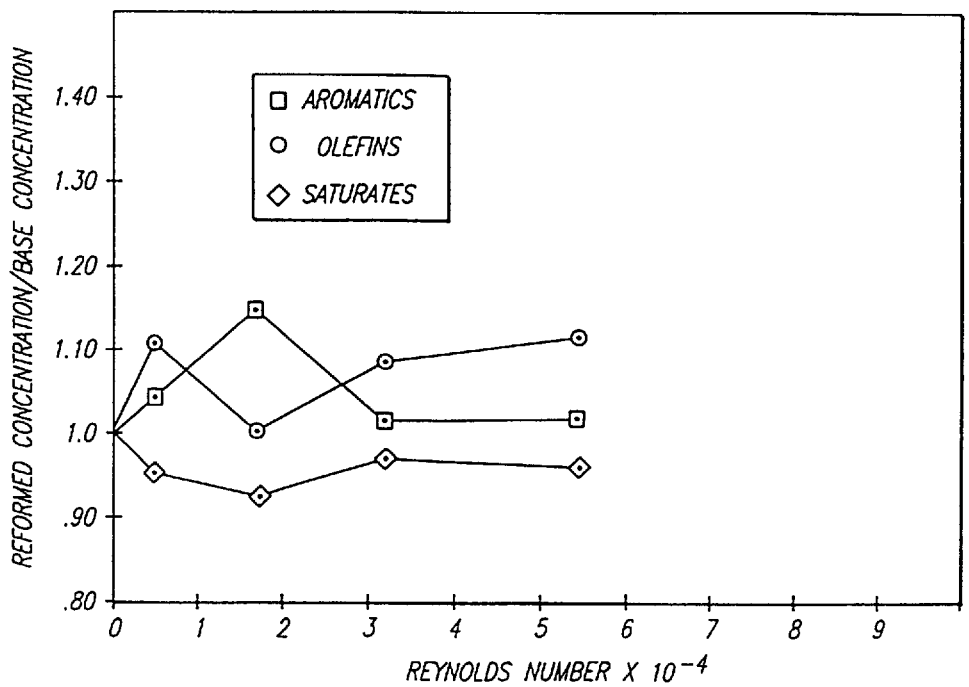
FIG. 4a is a graph which illustrates what occurs for a typical gasoline when a single pass over a typical catalyst is made for various Reynolds Numbers in the process.

FIG. 1 illustrates a typical catalyst 4 installed in a typical non-electrical conducting housing 3 which is basically a constant diameter tube. Reynolds Number for pipe flow is defined as follows:

Re=VD/u where:

V=Core velocity in meters/sec

D=Hydraulic Diameter in meters u=Kinematic Viscosity in meters squared per second FIG. 2 is a cross-sectional view of the configuration depicted in FIG. 1. The area FA available for fluid to pass through this assembly is defined as the flow area, and is equal to the cross-sectional area of the tube minus the cross-sectional area of the catalyst. The flow area is used to calculate an equivalent round pipe hydraulic diameter. Hydraulic diameter is defined as follows:

$$\text{Flow Area} = \frac{\pi D^2}{4}$$

or solving for hydraulic diameter D, $$D = \sqrt{4 * (\text{flow area in meters}^2)/\pi}$$

Flow velocity, V, is calculated as follows:

V=cubic meters per second/flow area in square meters

Kinematics viscosity is taken from Table 1.14(z), page 14 of "Introduction to Fluid Mechanics, 2nd edition, by James E. A. John and William L. Haberman."

---

Sample calculation:

| | | |
|---|---|---|
| Tube cross-sectional area | | = .0005 square meters |
| Catalyst cross-sectional area | | = .0004 square meters |
| Flow rate | | = .001 cubic meters per second |
| Flow area | | = .0005 m²–.0004 m² |
| | | = .0001 m² |
| Flow velocity | V | = (.001 m³/s)/.0001 m² |
| | V | = 10 m/s |
| Hydraulic diameter | D | = $\sqrt{4 * (.0001 \text{ m}^2)/\pi}$ |
| | D | = .00012 m |
| Fluid viscosity | u | = .000002 m²/5 |
| Reynolds Number | Re | = (10) * (.00012)/.000002 |
| | Re | = 600 |

---

In the present process, the critical aspects of the present invention are the control of the Reynolds Number of the fluid and the number of exposures of the fluid to the catalyst.

Additionally the catalyst is electrically isolated. A schematic of a typical system is given on FIG. 3. In this process the hydrocarbon fuel is drawn from the source (fuel tank) 1, through a filter 2, into the isolating chamber 3 and over the catalyst 4, through a constant speed pump 5, discharged through a fuel line 6 back into the source 1.

Figure 4B:
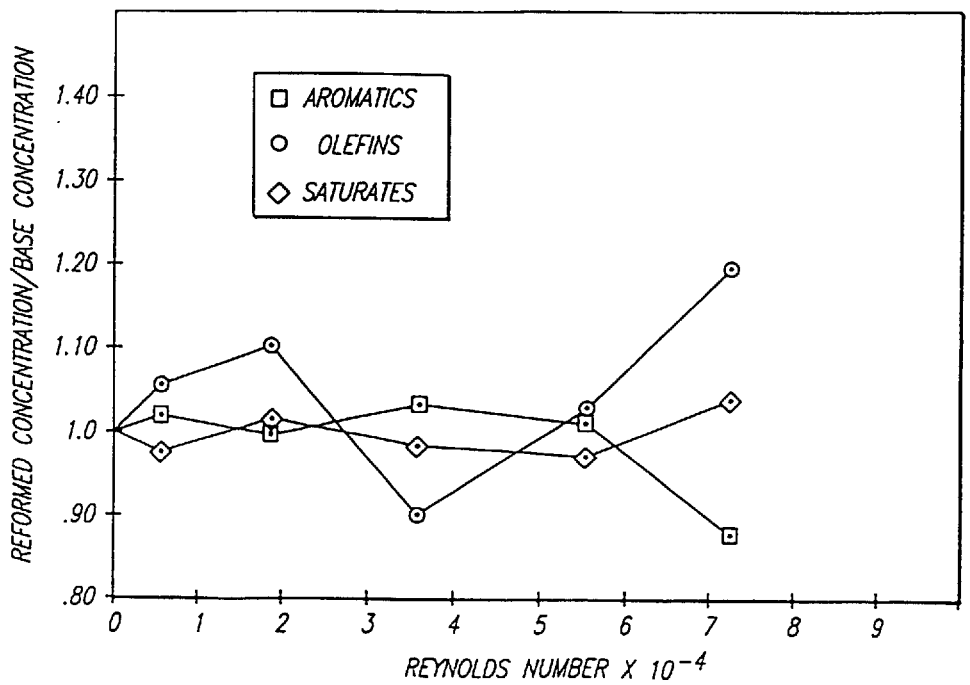
FIG. 4b is a graph which illustrates what occurs for a typical gasoline after 25 passes over a typical catalyst is made for various Reynolds Numbers in the process.
Figure 4C:
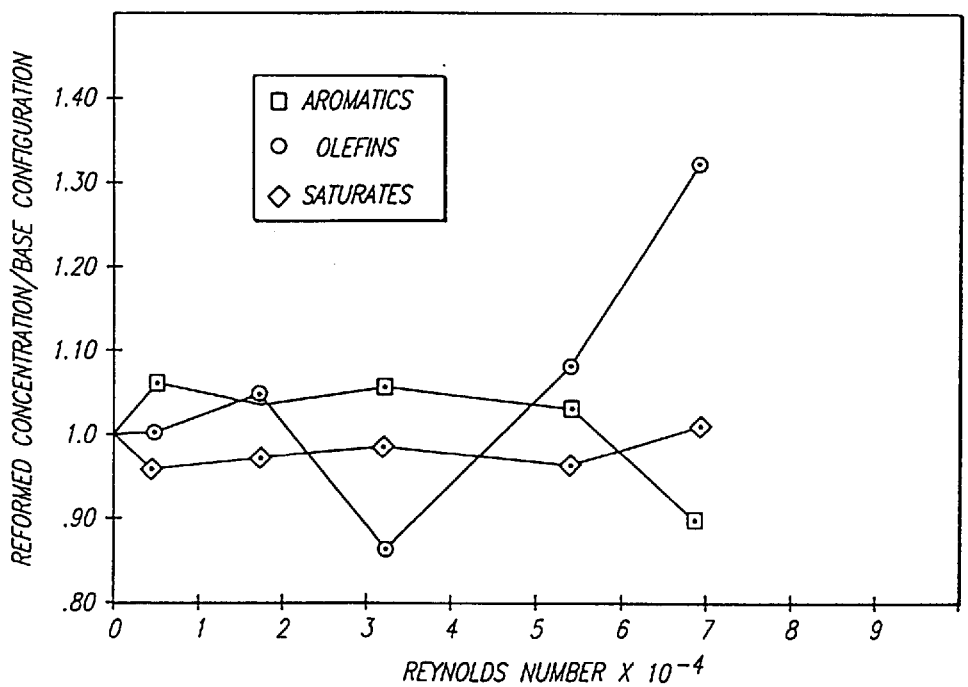
FIG. 4c is a graph which illustrates what occurs for a typical gasoline after 80 passes over a typical catalyst is made for various Reynolds Numbers in the process.

FIG. 4a illustrates what occurs for a typical gasoline when a single pass over a typical catalyst is made and FIGS. 4b and 4c illustrate what occurs with multiple passes and for various Reynolds Numbers for the process described above. The aromatic, olefin and saturate fractions of the fuel are altered at the various Reynolds Numbers. The aromatic fraction of the fuel is reduced, at certain Reynolds Numbers as the number of passes are increased, in particular at values higher than about $5 \times 10^4$ and then is seen to increase with a higher number of passes.

The inflection point where the aromatic fractions start to reverse and increase with a higher number of passes appears to be a saturation point for the saturates and the point at which reforming of the saturates occur back to other hydrocarbon forms. In FIGS. 4a–4c, the process is clearly shown to be controlled by the Reynolds Number of the fluid and number of cycles.

Figure 5:
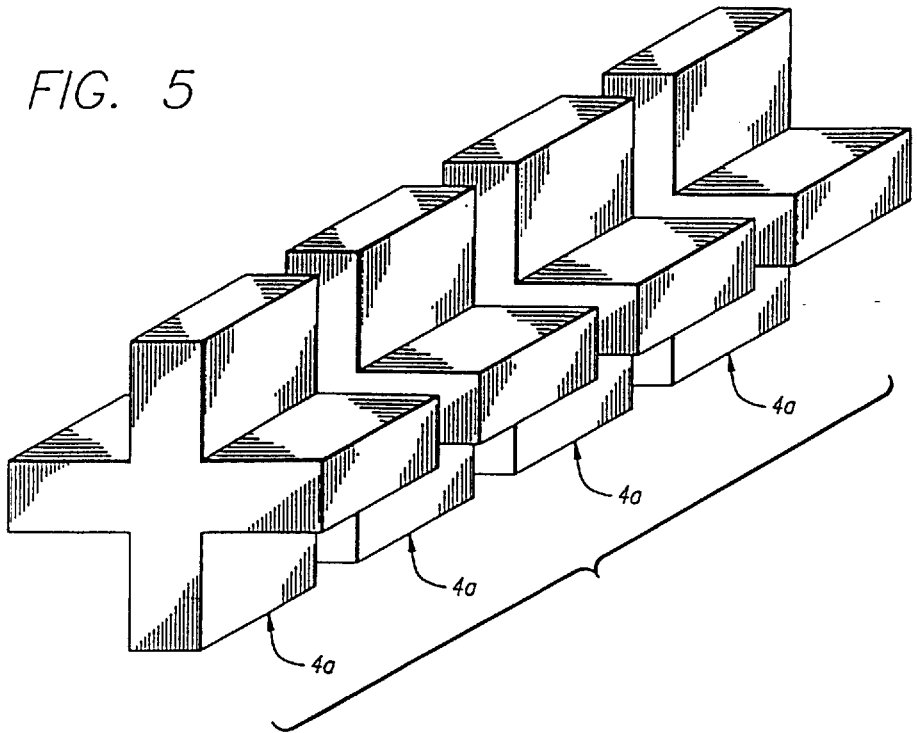
FIG. 5 illustrates a preferred catalyst configuration which simulates a packed column.

A preferred catalyst configuration is shown on FIG. 5. This configuration simulates a packed column. Each radial segment 4a is joined to the adjacent segment by a reduced diameter of material (not shown). The fuel (gasoline, diesel or kerosene) flows past each radial segment at the desired Reynolds Number. By tripping the flow (flow area change) after each radial segment a new cycle is started. This is equivalent to a recirculation (pass) of the fuel over the catalyst. The radial elements in alternate axial positions may be rotated up to 45° from the previous radial element to achieve even a closer simulation of a packed column. This configuration can be used where a large number of cycles are required to treat the fuel or when a limited number of passes occur such as in an in-line installation on older carburated engines.

The preferred catalyst configuration is subject to all of the previously defined criteria, such as, Reynolds Number range, electrical isolation and catalyst composition. However, when, for example, a 12 radial element catalyst is used what would have been a single pass over the catalyst becomes 12 passes. Thus it is possible with two of the preferred catalysts in series in an in-line system to produce a 24 pass system on the in-line configuration if the Reynolds Number criteria has been met.

The basic invention has been previously described in the U.S. patent application Ser. No. 07/941,408, now U.S. Pat. No. 5,393,413 incorporated herein by reference. In the present invention, various metal alloys, when used as the metal catalyst in the previously described apparatus and methods, will alter the performance characteristics of hydrocarbon fuels. The nature of this alteration will vary with the composition of the alloy but will be in the form of an improvement in fuel economy. a reduction in hydrocarbon emissions, a reduction in carbon monoxide emissions or a combination of these fuel produced factors.

The catalysts compositions are given in Table 1.

TABLE 1

| | "PURE" METAL | | ALLOYS | | | |
| --- | --- | --- | --- | --- | --- | --- |
| | COPPER | | Al | | STEEL | TITANIUM |
| ELEMENT | CO110 | LEAD | 2024 | Cu/Ni | LEDLOY 302SS | Ti6Al4V |
| ALUMINUM | | | 92.25 | | | 6 |
| CARBON | | | | | .15 .15 | |
| COPPER | 100 | | 4.3 | 44.7 | | |
| IRON | | | .5 | .2 | 98.23 70.77 | .2 |
| LEAD | | * | | .03 | .25 | |
| NICKEL | | | | 27.83 | 9 | |
| SULFUR | | | | .008 | .3 | |
| SILICON | | | | | .03 | |
| ZINC | | | .25 | 9.85 | | |
| CHROMIUM | | | .1 | | 18 | |
| MANGANESE | | | .5 | <.01 | 1 2 MAX | |
| PHOSPHORUS | | | .6 | | .065 .045 | |
| MAGNESIUM | | | 1.5 | | | |
| TITANIUM | | | | | | 89.8 |
| VANADIUM | | | | | | 4 |
| TIN | | | | 17.38 | | |

*The lead used in these tests was from a fishing sinker and was not analyzed for chemical content; however it is believed that the lead may be an alloy most likely containing antimony.

As can be seen from the following data set forth throughout the present application, pure metals do not produce the as successful results found with alloys. This was an unexpected result since the electrical resistivity of most pure metals (elements) is relatively low, which was initially believed to be an important factor in the present invention. While the theory of how this process works is not totally understood, it now appears that the finer grain size of the metal alloys allow catalysts made from those alloys, when used in this process, to act as a series of multiple cathode electrical surface sites to exchange electrons with the hydrocarbons in the fuel. In this connection, previous tests had shown that when the catalyst is electrically grounded the fuel performance gains are negated.

Resistivity and approximate grain size of the metal catalysts evaluated are given in Table 2. The "pure" metal has a larger grain size than the alloys. For the copper/nickel alloys the rate of solidification is rapid thus producing very fine grain structures similar to those found in the low carbon steel alloy (Ledloy). Pure copper has a very large grain size as do most non-alloy metals, and this is one of the reasons for the very low electrical resistivity of copper and aluminum. When nickel is alloyed with copper the result is an alloy with an electrical resistivity between 15 to 20 times greater than pure copper.

TABLE 2

ELECTRICAL RESISTIVITY (microhms/cm)

| "PURE" METAL | | ALLOYS | | | | |
| --- | --- | --- | --- | --- | --- | --- |
| COPPER C0110 | LEAD | ALUMINUM 2024 | Cu/Ni | STEEL LEDLOY | 302SS | TITANIUM Ti6Al4V |
| 1.71 | ~25 | 3.5–5.7 | 28 | 17 | 72 | 171 |
| | | ASTM GRAIN SIZE NUMBER[1] | | | | |
| 1 | — | 5–6 | — | 10 | 6–8 | 10 |

[1]-from Metals Handbook Vol 7 Atlas of Microstructures of Industrial Alloys, 8th Edition, 1972.

In the teachings of the parent patent, it was stated that the degree of reforming and the specific products formed is a function of the chemical composition of the catalyst, the composition of the hydrocarbon fuel, the Reynolds Number of the fluid flowing in the line at the catalyst, the number of exposures of the total mass of fuel involved to the catalyst and the temperature of the fuel. In the series of tests herein reported the chemical composition of the catalyst and the composition of the fuel was varied, the other parameters were held as constant as possible. The present invention thus supports the conclusions set forth in the parent patent.

Three separate test series were performed in the continuing evaluation of the effects of metal composition on the effectiveness of these metal when used in this invention, they were:

Test series I—Road performance tests, emission measurements and fuel composition comparisons of base fuels and fuels processed using two widely differing catalyst chemical composition alloys.

Test series II—Engine dynamometer tests comparing engine performance and hydrocarbon/carbon monoxide emissions from base fuels and fuels processed using four widely varying metal alloy catalyst composition.

Test series III—Road performance tests of base fuels and fuels processed using six widely varying catalyst chemical compositions and fuels processed using one "pure" metal catalysts (non-alloy).

TEST SERIES I RESULTS

The two alloys evaluated in this test series were copper/nickel and a low carbon steel alloy (Ledloy). The base fuel was ARCO unleaded 87 Octane summer grade gasoline. The two test vehicles were:

Vehicle A

1988 Chevrolet S10 Blazer 4WD 2.8 I Engine: This is the same vehicle used to develop data presented in the original patent. This vehicle had a transmission overhaul and engine service prior to these tests which resulted in an improvement in the baseline mileage (MPG) of the vehicle.

Vehicle B

1969 Chevrolet Kingswood 350 CID Carburated Engine: The performance results obtained from road tests is given in Table 3, the emission data are given in Table 4 and the chemical composition analyses of the fuels are given in Table 5. From these results it can be seen that the copper/nickel alloy produced the largest improvement in mileage, the greatest reduction of aromatics in the fuel and the lowest emissions of the two alloys.

These two alloys have consistently produced the best performance of all catalysts evaluated. The most common physical characteristics of these two alloys are: 1) They are both alloys but of widely different elements 2) They have very fine metallurgical grain size, and 3) They have similar electrical resistivities.

The emission data for vehicle B is given in Table 6 for the same conditions as those of Table 4. These data were generated to determine if there were differences between a computer controlled fuel system and a simple carburated fuel system and it was determined that there are differences. Comparing Table 4 and 6 it can be seen that the copper/nickel alloy fuel is more effective on the newer computer controlled vehicle and the Ledloy catalyst fuel is more effective on the carburated vehicle for these tests. There were no fuel mixture adjustments made to the carburated engine with either fuel. With the computer controlled engine vehicle A) adjustments to the engine fuel mixture are constantly being made.

TEST SERIES II RESULTS

This test series was conducted on an engine dynamometer test stand using a FORD 4.6L OHC Modular V8 with electronic ignition and fuel injection control. This engine was known to produce repeatable test stand data but had shown a sensitivity to octane levels in the gasoline.

Four different alloy catalyst were evaluated:

Aluminum alloy 2024

Copper/nickel

Ledloy C1018

Titanium Ti6A14v

The test fuel was ARCO unleaded 87 octane winter grade gasoline. The results from these tests are summarized in Tables 7, 8 and 9.

Table 7 gives the data for normal computer controlled auto-mode. These data show all catalysts to have reduced hydrocarbon and carbon monoxide emissions to varying degree for this operating mode. At high RPM the Titanium alloy produced slightly higher hydrocarbon emission but lower carbon monoxide emissions than the base fuel. Table 8 gives the data for the first increment of "slewing" the engine computer to produce air-lean mixtures. The copper/nickel and Ledloy catalyst fuels were able to perform over the entire range of rpms for this engine without pre-detonation. The base fuel and the Titanium and Aluminum catalyst fuels performed satisfactory at low rpms but produced extreme pre-detonation at 3750 RPM with lesser pre-detonation at 3000 and 4500 RPM.

Table 9 gives the data for the second increment of "slewing" the engine computer to produce even more airlean mixtures. At this slew rate the copper/ nickel and Ledloy catalysts fuels gave satisfactory performance at low RPM but exhibited severe pre-detonation at 3750 RPM with lesser pre-detonation at 4500 RPM.

Earlier testing of this engine on this stand had shown that with the copper/nickel catalyst fuel the operating range of this engine could be extended to very lean air-fuel ratios over the standard (base) fuel, thus improving the fuel consumption and lowering hydrocarbon and carbon monoxide emissions.

Those results gave tremendous insight as to how the mileage improvements of the road tests are produced. With a computer driven fuel system, an engine operating on fuel processed by the invention can operate in modes (air lean) that with normal fuels it can not. These data show that the basic engine operating conditions are not changed, but instead, that the engine can efficiently operate under a wide range of conditions, and with lower carbon monoxide emissions and lower hydrocarbon emissions. Part of the lower hydrocarbon emissions are due solely to the changes in the fuel structure, this is seen in the comparisons in the Auto mode where substantial hydrocarbon reductions are seen at basically the same fuel mixture ratios for all fuels.

The earlier tests were conducted using a different sample of ARCO unleaded 87 octane winter grade of gasoline as a base fuel. In those tests the engine was able to run satisfactorily on the base fuel at a slew rate of 1.1 but encountered severe pre-detonation at a rate of 1.2. The fuel processed with the copper/nickel catalyst showed no pre-detonation through a slew rate of 1.3, at which point a loss of power occurred.

Those tests when compared to the later test have shown that the base fuel is critical to the absolute performance of the fuel processed by the invention but that a significant improvement in fuel performance with reduced emissions was found on fuel processed by the invention with both base fuels over the performance of the base fuels. The data from the earlier test is given in Table 10.

TEST SERIES III

This test series was a road test to determine mileage changes for the four catalyst produced fuels as used in test series II and to evaluate one "pure" metal catalysts, another iron based alloy, 302 SS and a lead based alloy. These tests were made using vehicle A and ARCO unleaded 87 octane winter grade gasoline as a base fuel. Each processed fuel was treated in the same manner using the same pump set-up for a total number of cycles over the catalyst of 25. Each catalyst was machined to the same dimensions to produce a calculated Reynolds Number of approximately $6.6 \times 10^4$.

The dyno tests results indicated that the electrical resistivity might be an important parameter, therefore alloys and metals were chosen to span the full range of electrical resistivity for these tests (see Table 2).

The results of this test series are given in Table 11. It is concluded that fuels processed by the alloy catalysts produced increases in mileage performance of the vehicle and with the fuel from the pure metal did not.

TABLE 3

REFORMED FUEL ROAD TESTS VEHICLE A
SUMMER GRADE GASOLINE

| | BASE FUEL | CATALYST REFORMED FUELS | |
| --- | --- | --- | --- |
| | | LEDLOY | COPPER/NICKEL |
| FLOW RATE GPM | | 1.6 | 1.6 |
| # OF CYCLES | | 25 | 25 |
| REYNOLDS No × 10$^4$ | | 6.6 | 6.6 |
| MILES DRIVEN | 1573 | 1101 | 471 |
| MPG | 20.31 | 23.40 | 22.60 |
| % INCREASE | 0 | 15.21 | 11.27 |

TABLE 4

REFORMED FUEL EMISSION DATE VEHICLE A
SUMMER GRADE GASOLINE

| | BASE FUEL | REFORMED FUELS | |
| --- | --- | --- | --- |
| | | LEDLOY | COPPER/NICKEL |
| FLOW RATE GPM | | 1.6 | 1.6 |
| # OF CYCLES | | 25 | 25 |
| ENGINE RPM | 2621 | 2641 | 2658 |
| HC (PPM) | 58 | 52 | 40 |
| CO (PCT) | .21 | .20 | .06 |
| CO$_2$ (PCT) | 14.9 | 14.8 | 14.9 |
| O$_2$ (PCT) | 0.9 | 1.4 | 0.7 |
| ENGINE RPM | 1886 | 1879 | 1854 |
| HC (PPM) | 57 | 61 | 49 |
| CO (PCT) | .10 | .17 | .12 |
| CO$_2$ (PCT) | 15.1 | 14.8 | 14.9 |
| O$_2$ (PCT) | 0.5 | 0.9 | 0.5 |
| ENGINE RPM | 1181 | 1174 | 1165 |
| HC (PPM) | 68 | 64 | 44 |
| CO (PCT) | .27 | .16 | .03 |
| CO$_2$ (PCT) | 14.9 | 14.7 | 14.8 |
| O$_2$ (PCT) | 0.5 | 0.8 | 0.5 |
| ENGINE RPM | 873 | 823 | 861 |
| HC (PPM) | 320 | 290 | 245 |
| CO (PCT) | 6.1 | 4.56 | 2.51 |
| CO$_2$ (PCT) | 11.3 | 12.1 | 13.5 |
| O$_2$ (PCT) | 0.5 | 0.5 | 0.3 |

TABLE 5

FUEL APPROXIMATE ANALYSIS[1] FOR
AROMATICS, OLEFINS AND SATURATES
ARCO UNLEADED 87 OCTANE GASOLINE BASE FUEL

| | BASE | LEDLOY | COPPER/NICKEL |
| --- | --- | --- | --- |
| AROMATICS, VOL PCT | 31.6 | 30.8 | 29.9 |
| OLEFINS, VOL PCT | 10.2 | 10.1 | 8.5 |
| SATURATES, VOL PCT | 58.2 | 59.1 | 61.6 |

[1]Analysis method ASTM D - 1319

TABLE 6

REFORMED FUEL EMISSION DATA VEHICLE B
SUMMER GRADE GASOLINE

| | BASE FUEL | CATALYST REFORMED FUELS | |
| --- | --- | --- | --- |
| | | LEDLOY | COPPER/NICKEL |
| FLOW RATE GPM | | 1.6 | 1.6 |
| # OF CYCLES | | 25 | 25 |
| ENGINE RPM | 2507 | 2526 | 2517 |

TABLE 6-continued

REFORMED FUEL EMISSION DATA VEHICLE B SUMMER GRADE GASOLINE

| | CATALYST REFORMED FUELS | | |
|---|---|---|---|
| | BASE FUEL | LEDLOY | COPPER/NICKEL |
| HC (PPM) | 146 | 148 | 115 |
| CO (PCT) | 2.64 | 2.47 | 2.15 |
| $CO_2$ (PCT) | 13.4 | 13.5 | 13.5 |
| $O_2$ (PCT) | 2.3 | 1.1 | — |
| ENGINE RPM | 1812 | 1818 | 1807 |
| HC (PPM) | 229 | 222 | 199 |
| CO (PCT) | 3.88 | 3.67 | 3.22 |
| $CO_2$ (PCT) | 12.6 | 12.7 | 12.8 |
| $O_2$ (PCT) | 1.1 | 0.7 | 1.4 |
| ENGINE RPM | 1184 | 1230 | 1205 |
| HC (PPM) | 195 | 182 | 164 |
| CO (PCT) | 4.71 | 4.22 | 3.45 |
| $CO_2$ (PCT) | 12.1 | 12.4 | 12.7 |
| $O_2$ (PCT) | 0.7 | 0.5 | 0.9 |
| ENGINE RPM | 703 | 718 | 711 |
| HC (PPM) | 244 | 248 | 219 |
| CO (PCT) | 4.17 | 3.90 | 12.4 |
| $CO_2$ (PCT) | 12.3 | 12.3 | 12.4 |
| $O_2$ (PCT) | 0.9 | 0.7 | 0.9 |

LEGEND FOR TABLES 7, 8, 9 AND 10
Abbreviation    Explanation
BSFC Brake Specific Fuel Consumption
AF Air to Fuel Ratio
HC Direct Engine Exhaust Emission of Hydrocarbons in PPM Volume
CO Direct Engine Exhaust Emission of Carbon Monoxide in Percent Volume

TABLE 7

ENGINE DYNAMOMETER REFORMED FUEL DATA AUTO MODE

| RPM | RUN# | BASE (807) | TITANIUM (815) | ALUMINUM (817) | Cu/Ni (809) | IRON (812) |
|---|---|---|---|---|---|---|
| 1500 | BSFC | .499 | .516 | .484 | .492 | .509 |
| | AF | 12.55 | 12.68 | 12.71 | 12.63 | 12.69 |
| | HC | 280 | 265 | 185 | 280 | 230 |
| | CO | 4.8 | 3.1 | 4.4 | 4.9 | 3.6 |
| 2250 | BSFC | .478 | .479 | .484 | .475 | .487 |
| | AF | 12.46 | 12.50 | 12.37 | 12.32 | 12.44 |
| | HC | 295 | 280 | 200 | 260 | 245 |
| | CO | 5.6 | 4.5 | 5.0 | 5.7 | 4.8 |
| 3000 | BSFC | .475 | .483 | .484 | .487 | .487 |
| | AF | 12.27 | 12.39 | 12.40 | 12.27 | 12.28 |
| | HC | 185 | 173 | 135 | 165 | 155 |
| | CO | 6.3 | 5.7 | 5.95 | 6.4 | 5.6 |
| 3750 | BSFC | .503 | .502 | .499 | .505 | .513 |
| | AF | 12.29 | 12.28 | 12.32 | 12.25 | 12.30 |
| | HC | 135 | 150 | 100 | 115 | 125 |
| | CO | 6.3 | 5.8 | 6.3 | 6.4 | 5.8 |
| 4500 | BSFC | .512 | .505 | .507 | .517 | .513 |
| | AF | 12.70 | 12.83 | 12.74 | 12.67 | 12.77 |
| | HC | 100 | 123 | 75 (55) | 87 | 100 |
| | CO | 5.35 | 4.5 | 4.9 (4.3) | 5.3 | 4.93 |

TABLE 8

ENGINE DYNAMOMETER REFORMED FUEL DATA COMPUTER SLEWED 1.1–7% AIRLEAN

| RPM | RUN# | BASE (808) | TITANIUM (816) | ALUMINUM (818) | Cu/Ni (810) | IRON (813) |
|---|---|---|---|---|---|---|
| 1500 | BSFC | .447 | .438 | .454 | .437 | .435 |
| | AF | 13.73 | 13.84 | 13.83 | 13.75 | 13.70 |
| | HC | 235 | 225 | 175 | 195 | 160 |
| | CO | 1.35 | .90 | 1.3 | 1.05 | 1.1 |
| 2250 | BSFC | .442 | .439 | .440 | .439 | .441 |
| | AF | 13.53 | 13.59 | 13.51 | 13.47 | 13.51 |
| | HC | 235 | 225 | 190 | 195 | 185 |
| | CO | 1.9 | 1.5 | 1.65 | 1.4 | 1.45 |
| 3000 | BSFC | .438 | .439 | .439 | .437 | .445 |
| | AF | 13.33 | 13.54 | 13.53 | 13.48 | 13.37 |
| | HC | 140 | 160 | 120 | 135 | 1358 |
| | CO | 2.5 | 2.2 | 2.1 | 2.2 | 2.1 |
| 3750 | BSFC | .469 | .456 | .465 | .471 | .459 |
| | AF | 13.19 | 13.38 | 13.19 | 13.13 | 13.29 |
| | HC | 105 | 125 | 100 | 100 | 95 |
| | CO | 2.65 | 2.5 | 2.4 | 2.55 | 2.1 |
| 4500 | BSFC | .474 | .464 | .473 | .474 | .467 |
| | AF | 13.73 | 13.82 | 13.92 | 13.73 | 13.80 |
| | HC | 85 | 85 | 75 | 83 | 65 |
| | CO | 1.55 | .90 | 1.2 | 1.55 | .95 |

/All test points that are within the double-lined box exhibited pinging to some extent with severe pinging at 3750 RPM for all.

TABLE 9

ENGINE DYNAMOMETER REFORMED FUEL DATA
COMPUTER SLEWED 1.2–14% AIRLEAN

| RPM | RUN# | BASE* | TITANIUM* | ALUMINUM* | Cu/Ni (811) | IRON (814) |
|---|---|---|---|---|---|---|
| 1500 | BSFC | | | | .417 | .420 |
|  | AF | | | | 15.18 | 15.10 |
|  | HC | | | | 140 | 145 |
|  | CO | | | | .35 | .30 |
| 2250 | BSFC | | | | .398 | .407 |
|  | AF | | | | 14.65 | 14.85 |
|  | HC | | | | 143 | 150 |
|  | CO | | | | .62 | .67 |
| 3000 | BSFC | | | | .412 | .408 |
|  | AF | | | | 14.45 | 14.56 |
|  | HC | | | | 105 | 105 |
|  | CO | | | | 1.05 | 1.15 |
| 3750 | BSFC | | | | .444 | .439 |
|  | AF | | | | 14.22 | 14.38 |
|  | HC | | | | 80 | 75 |
|  | CO | | | | 1.2 | 1.15 |
| 4500 | BSFC | | | | .452 | .446 |
|  | AF | | | | 14.54 | 14.83 |
|  | HC | | | | 55 | 50 |
|  | CO | | | | .90 | .70 |

/All test points that are within the double-lined box exhibited pinging to some extent with severe pinging at 3750 RPM for both.
*No tests run due to severe pinging for these fuels at slew rate of 1.1.

TABLE 10

ENGINE DYNAMOMETER REFORMED FUEL DATA
TEST DATE 10/25/93

|  |  | BASE | | | COPPER/NICKEL | | | | |
|---|---|---|---|---|---|---|---|---|---|
| SLEW RATE | | AUTO | 1.1 | 1.2 | AUTO | 1.1 | 1.2 | 1.3 | 1.2 |
| RPM | RUN# | 794 | 795 | 796 | 797 | 798 | 799 | 800 | 801 |
| 1500 | BSFC | .502 | .439 | .410 | .486 | .433 | .425 | .415 | .417 |
|  | AF | 12.54 | 13.63 | 14.82 | 12.61 | 13.86 | 15.05 | 16.09 | 14.94 |
|  | HC | 343 | 300 | 195 | 300 | 245 | 153 | 108 | 150 |
|  | CO | 5.8 | 1.5 | 0.66 | 5.4 | 1.3 | 0.5 | 0.06 | 0.5 |
| 2250 | BSFC | .499 | .455 | .416 | .485 | .436 | .410 | .405 | .408 |
|  | AF | 12.20 | 13.32 | 14.40 | 12.18 | 13.41 | 14.58 | 15.88 | 14.55 |
|  | HC | 322 | 280 | 185 | 300 | 240 | 175 | 97 | 115 |
|  | CO | 6.37 | 2.15 | 1.15 | 6.2 | 2.1 | 0.9 | 0.08 | 0.9 |
| 3000 | BSFC | .502 | .449 | .414 | .493 | .446 | .418 | .405 | .417 |
|  | AF | 12.15 | 13.18 | 14.36 | 12.20 | 13.32 | 14.41 | 15.64 | 14.43 |
|  | HC | 205 | 170 | 105 | 205 | 130 | 87 | 65 | 78 |
|  | CO | 7.1 | 2.6 | 1.5 | 6.8 | 2.5 | 1.22 | 0.11 | 1.16 |
| 3750 | BSFC | .506 | .468 | .435 | .511 | .473 | .438 | .423 | .436 |
|  | AF | 12.39 | 13.21 | 14.42 | 12.29 | 13.29 | 14.27 | 15.48 | 14.43 |
|  | HC | 140 | 105 | 82 | 135 | 100 | 70 | 45 | 60 |
|  | CO | 6.7 | 2.6 | 1.22 | 6.3 | 2.5 | 1.2 | 0.1 | 1.21 |
| 4500 | BSFC | .501 | .473 | .454 | .520 | .476 | .457 | .453 | .463 |
|  | AF | 12.86 | 13.91 | 15.05 | 12.77 | 13.75 | 15.01 | 16.44 | 14.80 |
|  | HC | 105 | 85 | 45 | 105 | 75 | 45 | 32 | 30 |
|  | CO | 4.2 | 0.9 | 0.4 | 5.0 | 1.3 | 0.55 | 0.07 | 0.6 |

TABLE 11

CATALYST COMPOSITION EVALUATION ROAD MILEAGE PERFORMANCE
ARCO UNLEADED 87 OCTANE WINTER GRADE GASOLINE

|  | BASE | "PURE" COPPER | "PURE" LEAD | ALUMINUM 2024 | STEEL 302SS | TITANIUM Ti6Al4V | STEEL C1018 LEDLOY | Cu/Ni |
|---|---|---|---|---|---|---|---|---|
| GPM | — | 1.6 | 1.6 | 1.6 | 1.6 | 1.6 | 1.6 | 1.6 |
| #OF CYCLES | — | 25 | 25 | 25 | 25 | 25 | 25 | 25 |
| REYNOLDS # $\times 10^{-4}$ | — | 6.6 | 6.6 | 6.6 | 6.6 | 6.6 | 6.6 | 6.6 |
| MPG | 20.53 | 20.50 | 21.89 | 21.16 | 22.10 | 22.27 | 23.04 | 23.42 |
| % IMP | — | — | 6.62 | 3.07 | 7.65 | 8.48 | 12.23 | 14.08 |
| GRAIN SITR | — | 1 | — | 5–6 | 6–8 | 10 | 10 | ~10 |

We claim:

1. A method for reforming of light hydrocarbon fuels to obtain high quality fuel at a pressure in the range of approximately 10 to 100 psia and a temperature in the range between approximately −50° and 250° F. comprising the steps of:
   a) drawing said light hydrocarbon fuels from a fuel source;
   b) passing said fuel into a non-electrical conducting chamber and over a metal alloy catalyst at a Reynolds Number in a range of $2\times10^3$ to $20\times10^4$, said metal alloy catalyst selected from a group consisting of Aluminum alloy 2024, Ledloy C1018 and Titanium Ti6Al4v; and
   c) recirculating said fuel over said catalyst between 1 and approximately 100 cycles.

2. The method of claim 1 wherein said Reynolds Number is about $6\times10^4$.

3. A method for reforming of light hydrocarbon fuels to obtain high quality light hydrocarbon fuels at a pressure in the range of approximately 10 to 100 psia and a temperature in the range between approximately −50° and 250° F. comprising the steps of:
   a) drawing fuel through a filter from a storage tank containing a hydrocarbon fuel;
   b) passing said fuel into a non-electrical conducting chamber and over a metal alloy catalyst, selected from a group consisting of aluminum alloy 2024, Ledloy C1018, and Titanium Ti6Al4v at a Reynolds Number between approximately $2\times10^3$ and $20\times10^4$;
   c) discharging said fuel into at least one storage tank;
   d) repeating steps a–c on said discharged fuel of step c for at least one cycle but no more than 100 cycles.

* * * * *

UNITED STATES PATENT AND TRADEMARK OFFICE
CERTIFICATE OF CORRECTION

PATENT NO.    : 5,824,209
DATED         : October 20, 1998
INVENTOR(S)   : Arand et al.

It is certified that error appears in the above-identified patent and that said Letters Patent is hereby corrected as shown below:

Column 13,
Below the bottom outline of Table 10, insert -- Box: Pre-detonation --.

Signed and Sealed this

Thirtieth Day of July, 2002

Attest:

Attesting Officer

JAMES E. ROGAN
Director of the United States Patent and Trademark Office